US012744167B2

(12) United States Patent
Ahn et al.

(10) Patent No.: US 12,744,167 B2
(45) Date of Patent: Sep. 22, 2026

(54) ARC ELIMINATION DEVICE

(71) Applicant: LS ELECTRIC CO., LTD., Anyang-si (KR)

(72) Inventors: Kwanghyeon Ahn, Anyang-si (KR); Hyunwook Lee, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 326 days.

(21) Appl. No.: 18/291,873

(22) PCT Filed: Oct. 25, 2022

(86) PCT No.: PCT/KR2022/016381
§ 371 (c)(1),
(2) Date: Jan. 24, 2024

(87) PCT Pub. No.: WO2023/128188
PCT Pub. Date: Jul. 6, 2023

(65) Prior Publication Data

US 2024/0258045 A1 Aug. 1, 2024

(30) Foreign Application Priority Data

Dec. 27, 2021 (KR) ........................ 10-2021-0188628

(51) Int. Cl.
*H01H 9/30* (2006.01)

(52) U.S. Cl.
CPC .................................... *H01H 9/30* (2013.01)

(58) Field of Classification Search
CPC ............ H01H 9/30; H01H 3/54; H01H 3/227; H01H 3/264; H01H 33/50; H01H 33/36;
(Continued)

(56) References Cited

U.S. PATENT DOCUMENTS 6,518,865 B1 * 2/2003 Al-Hosini ............ H01H 33/285 335/147
9,842,717 B2 * 12/2017 Jeong ..................... H01H 71/04
(Continued)

FOREIGN PATENT DOCUMENTS

KR 200196865 Y1 7/2000
KR 101229746 B1 2/2013
(Continued)

OTHER PUBLICATIONS

Translation of KR20210090828 (Original document published Jul. 21, 2021) (Year: 2021).*
(Continued)

*Primary Examiner* — William A Bolton
(74) *Attorney, Agent, or Firm* — K&L Gates LLP

(57) ABSTRACT

An arc elimination device is disclosed. The arc elimination device according to an aspect of the present disclosure, may comprise: a housing; an arc extinguishing part which is positioned inside the housing and provided with a high-voltage electrode and a ground electrode therein; an operating rod movable to electrify or non-electrify the high-voltage electrode and the ground electrode inside the arc extinguishing part; a steering handle coupled to one end of the operating rod to move the operating rod; a moving plate arranged between the arc extinguishing part and the steering handle to press and move the steering handle; an actuator for providing a driving force for moving the moving plate; and a power transmission unit for providing the driving force of the actuator to the moving plate to move the moving plate in a direction in which the moving plate presses the steering handle.

12 Claims, 15 Drawing Sheets

(58) Field of Classification Search
CPC .. H01H 33/42; H01H 33/04; H01H 2033/024; H01H 2231/032; H01H 71/2481; H01H 71/04; H01H 71/52; H01H 71/18; H01H 2071/044; H01H 79/00; H02B 13/035; H02B 11/133; H02B 11/28; G01L 1/14
USPC ...... 218/156, 12, 19, 43, 45, 55, 67, 79, 80, 218/100, 101, 68, 152; 200/50.39, 400, 200/237, 402, 254
See application file for complete search history.

(56) References Cited

U.S. PATENT DOCUMENTS

| | | | | |
|---|---|---|---|---|
| 9,899,168 | B2 * | 2/2018 | Zheng | H02B 1/04 |
| 10,424,442 | B2 * | 9/2019 | Ahn | H01H 9/30 |
| 10,763,062 | B2 * | 9/2020 | Saxegaard | H01H 33/53 |
| 11,063,410 | B2 * | 7/2021 | Kisanuki | H02B 13/0358 |
| 2010/0294630 | A1 | 11/2010 | Park et al. | |
| 2017/0263389 | A1 | 9/2017 | Lee et al. | |

FOREIGN PATENT DOCUMENTS

| | | |
|---|---|---|
| KR | 20170003305 U | 9/2017 |
| KR | 20210071261 A | 6/2021 |
| KR | 20210090828 A | 7/2021 |

OTHER PUBLICATIONS

International Search Report for related International Application No. PCT/KR2022/016381; action dated Jul. 6, 2023; (2 pages).
Written Opinion for related International Application No. PCT/KR2022/016381; action dated Jul. 6, 2023; (4 pages).
Extended European Search Report for related European Application No. 22916342.3; action dated Oct. 31, 2025; (9 pages).

* cited by examiner (a)

(b)

(a)

(b)

(c)

(a)

(b)

(c)

(a)

(b)

ARC ELIMINATION DEVICE

CROSS-REFERENCE TO RELATED APPLICATIONS

This application is the National Stage filing under 35 U.S.C. 371 of International Application No. PCT/KR2022/016381, filed on Oct. 25, 2022, which claims the benefit of earlier filing date of and rights of priority to Korean Application 10-2021-0188628, filed on Dec. 27, 2021, the contents of which are all hereby incorporated by reference herein in their entirety.

FIELD

The present disclosure relates to an arc elimination device, and more specifically, to an arc elimination device that is capable of remotely moving a handle of the arc elimination device.

BACKGROUND

A switchgear is a facility that receives power and supplies the received power to load facilities. The switchgear may convert high-voltage power into low-voltage power and distribute it. The switchgear may include therein a switch, a lightning arrester, a transformer, a circuit breaker, and various types of measuring equipment.

An arc eliminator may be installed in this switchgear. The arc eliminator is a high-speed switch with ground closing capability. When an optical sensor inside the switchgear detects an arc, the optical sensor transmits an operation signal to the arc eliminator, and the arc eliminator receives the operation signal and performs a grounding operation.

In other words, in normal conditions, the arc eliminator may keep insulating a high-voltage electrode and a ground electrode in an open state (electrically-disconnected state). When an arc occurs in the switchgear, the arc eliminator may electrically connect the two electrodes to short-circuit and ground three phases in a power system, thereby eliminating the arc.

The high-voltage electrode may be connected to a fixed busbar of the switchgear to constantly apply high-voltage power, and the ground electrode may be connected to the ground at a switchgear installation location through a ground busbar or ground cable.

The arc eliminator may include an arc extinguishing part filled with SF6, which is an inert gas with excellent insulation properties. Inside the arc extinguishing part, the high-voltage electrode and the ground electrode may be installed to be spaced apart from each other, and a movable electrode may be installed to be movable.

The movable electrode may be moved to be in contact with each of the high-voltage electrode and the ground electrode such that the high-voltage electrode and the ground electrode are electrically connected to each other (closed state). Additionally, the movable electrode may be moved not to be in contact with at least one of the high-voltage electrode and the ground electrode to insulate the high-voltage electrode and the ground electrode from each other (open state).

When the arc eliminator is in the closed state, a handle, which is formed integrally with the movable electrode, also moves. At this time, in the related art arc eliminator, to return the arc eliminator to the open state, the user has pulled the handle directly with a hand to move the movable electrode to the original position before the closed state.

However, when the arc eliminator is in the closed state, the high-voltage electrode and the ground electrode are electrically connected to each other, so a safety problem has arisen when the user directly touches and operates the movable electrode connected to the high-voltage electrode and the handle. Accordingly, there has been an urgent need for the development of an arc eliminator that can return the movable electrode to the open state without a direct contact with the handle of the arc eliminator.

SUMMARY

The present disclosure is to solve the above problems, and an aspect of the present disclosure is to provide an arc elimination device that is capable of returning a handle of the arc elimination device to its original position without a direct contact with the handle in order to electrically disconnect a high-voltage electrode and a ground electrode inside an arc extinguishing part.

Another aspect of the present disclosure is to provide an arc elimination device that is capable of suppressing a handle of the arc elimination device from being excessively drawn out of an arc extinguishing part and damage on other components in the process of returning the handle to its original position to electrically disconnect a high-voltage electrode and the ground electrode.

The problems to be solved in the present disclosure may not be limited to the aforementioned, and other problems to be solved by the present disclosure, which are not mentioned, will be obviously understood by a person skilled in the art based on the following description.

To achieve these and other advantages and in accordance with the purpose of the present disclosure, as embodied and broadly described herein, there is provided a an arc elimination device including: a housing; an arc extinguishing part that is located inside the housing and provided with a high-voltage electrode and a ground electrode therein; an operating rod that is movable to electrically connect or disconnect the high-voltage electrode and the ground electrode inside the arc extinguishing part; a handle that is coupled to one end of the operating rod to move the operating rod; a moving plate that is disposed between the arc extinguishing part and the handle to be movable while pressing the handle; an actuator that applies driving force to move the moving plate; and a power transmission unit that transmits the driving force of the actuator to the moving plate so that the moving plate is moved in a direction of pressing the handle.

Here, the moving plate may be formed to be movable between a first position spaced apart from the arc extinguishing part in a direction toward the handle and a second position located closer to the arc extinguishing part than the first position.

Here, the arc elimination device may further include: a control unit that controls the actuator; and a first switch and a second switch that generate a start signal for controlling the actuator, and the control unit may control the moving plate to move from the first position to the second position when the first switch is pressed, and stop an operation of the actuator when the second switch is pressed.

Here, the arc extinguishing part may be configured so that the ground electrode and the high-voltage electrode are in an electrically-disconnected state when the handle is located at a third position, and the arc elimination device may further include a third switch that is pressed by the handle when the handle is located at the third position, and a signal generation unit that generates a specific signal when the third switch is pressed.

Here, the arc elimination device may further include a first base plate that is disposed adjacent to the first position and fixed to the housing, and a second base plate that is disposed adjacent to the second position and fixed to the housing.

The first switch may be installed on the first base plate to be pressed by the moving plate when the moving plate is located at the first position, the second switch may be installed on the second base plate to be pressed by the moving plate when the moving plate is located at the second position.

The first switch and the second switch may be each limit switches.

The arc elimination device may further include an elastic member that is disposed on the moving plate to alleviate impacts between the moving plate and the handle.

The actuator may be a motor having a rotational shaft, the control unit may rotate the rotational shaft in one direction when receiving a return signal and rotate the rotational shaft in a direction opposite to the one direction when the first switch is pressed.

A nut unit may be coupled to the moving plate to be movable integrally with the moving plate, and the power transmission unit may include a screw shaft that is coupled to the nut unit and is rotated by the motor.

The power transmission unit may include a plurality of spur gears connecting the screw shaft and the rotational shaft of the motor.

The nut unit may include a coupling groove, the nut unit and the moving plate may be coupled by a coupling member which has one end inserted into the coupling groove and another end protruding toward the first base plate through the moving plate, and the one end of the coupling member may be separated from the coupling groove when the another end of the coupling member is pressed by the first base plate, so that the coupling between the nut unit and the moving plate is released.

A fixing spring may be installed on the coupling member to provide elastic force for inserting the one end of the coupling member into the coupling groove.

The arc elimination device may further include a guide rod that is disposed in parallel to a moving direction of the moving plate and having both ends fixedly coupled to the housing and the first base plate, and the guide rod may penetrate the moving plate.

The arc extinguishing part may be provided in plurality, and the plurality of arc extinguishing parts may be disposed side by side to be adjacent to each other.

According to the above configuration, in an arc elimination device according to one embodiment of the present disclosure, a moving plate may be disposed between an arc extinguishing part and a handle, and configured to press and move the handle by receiving driving force from an actuator, thereby returning the handle without a user's direct contact with and manipulation of the handle.

In an arc elimination device according to one embodiment of the present disclosure, a coupling member for coupling a moving plate and a nut unit may transfer driving force generated from an actuator to the moving plate. Accordingly, when the moving plate moves beyond a preset section, the coupling between the nut unit and the moving plate can be released, such that the moving plate cannot receive the driving force from the actuator. This can result in suppressing a handle of the arc elimination device from being excessively pulled out of an arc extinguishing part and preventing other components from being damaged due to the motion of the moving plate in the process of returning the handle to its original position.

The effects of the present disclosure are not limited to those described above, and should be understood to include all effects that can be inferred from the configuration of the invention described in the detailed description or claims of the present disclosure.

Figure 7:
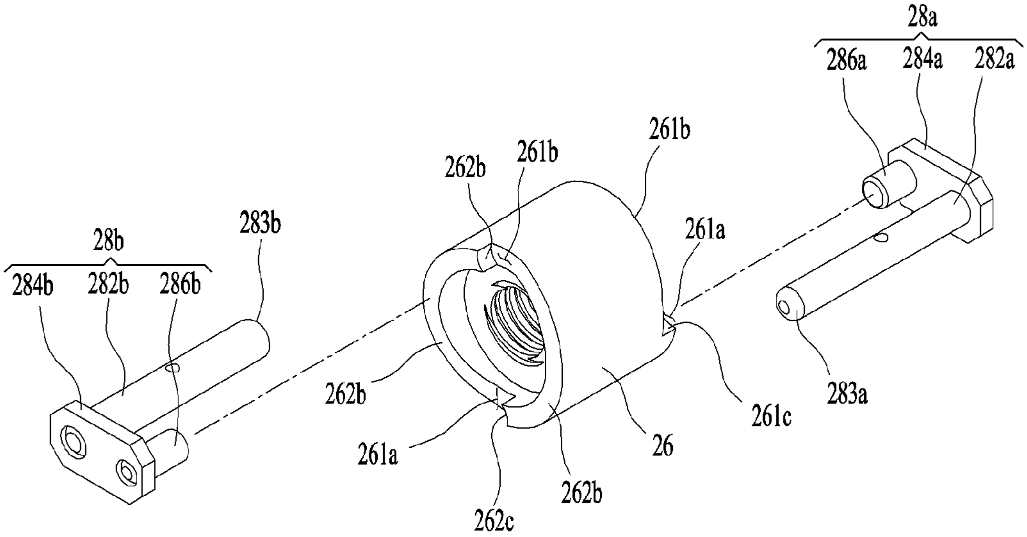
Figure 7:
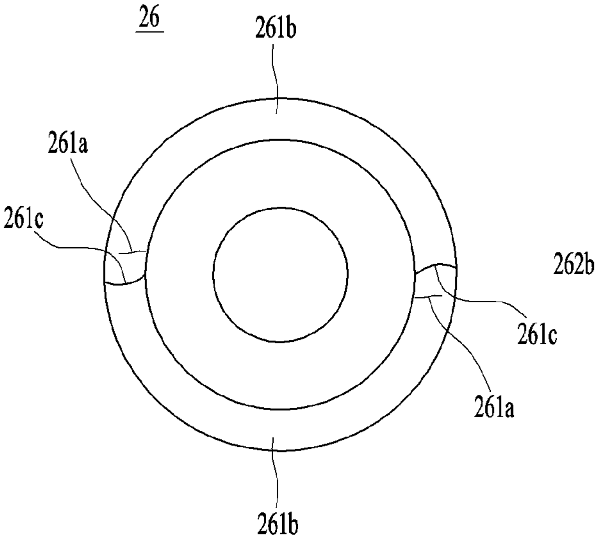
Figure 7:
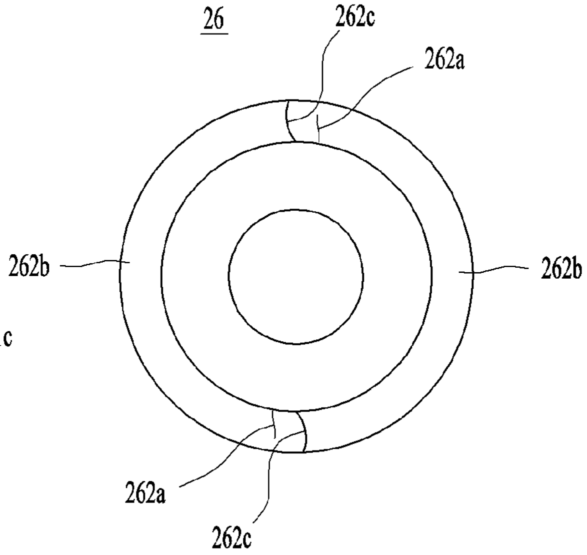

(a) of FIG. 7 is an exploded perspective view illustrating a nut unit and a coupling member of an arc elimination device according to one embodiment of the present disclosure, and (b) and (c) of FIG. 7 are a front view and a rear view illustrating the nut unit in accordance with the one embodiment of the present disclosure.

Figure 8:
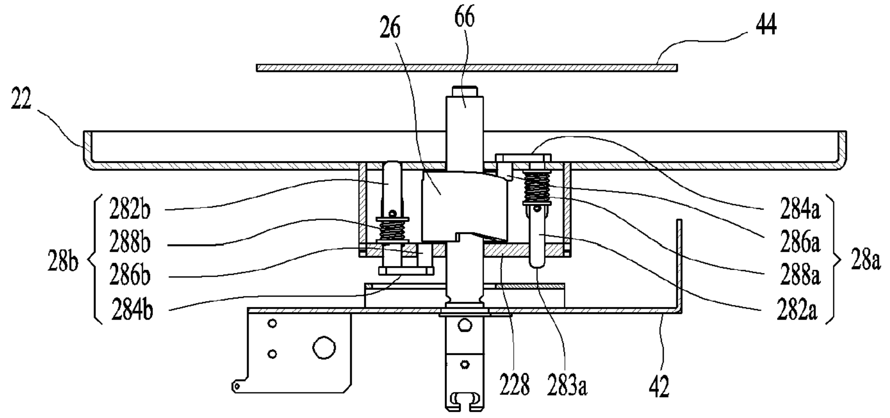
Figure 8:
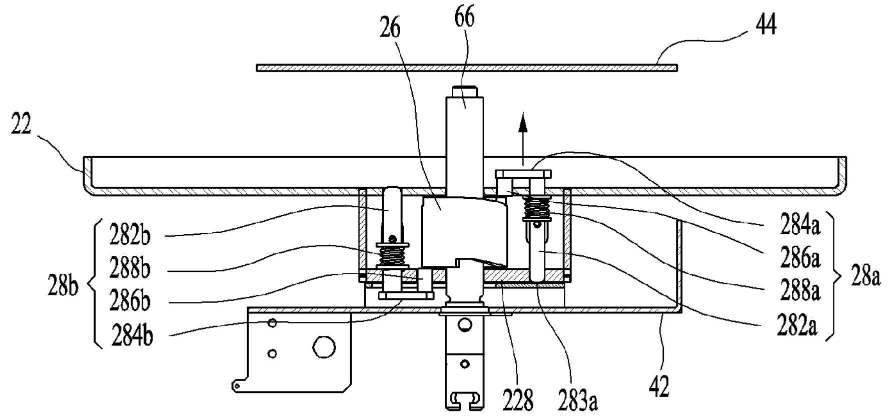
Figure 8:
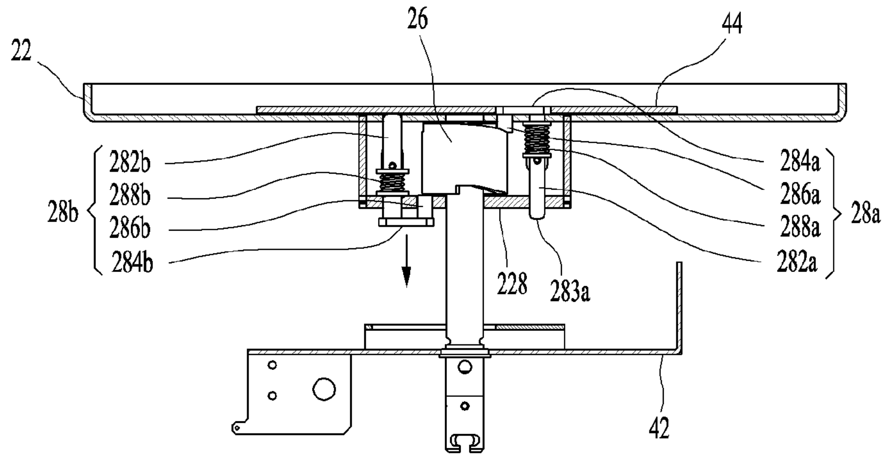

FIG. 8 is a view illustrating an operation of a coupling member of an arc elimination device in accordance with one embodiment of the present disclosure. Configurations that are not necessary for explanation are not shown.

Figure 9:
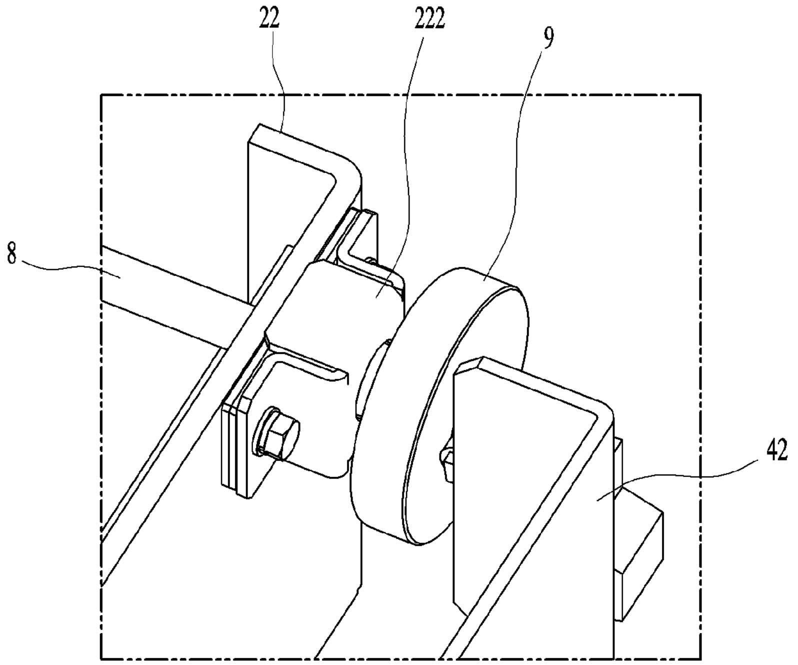
Figure 9:
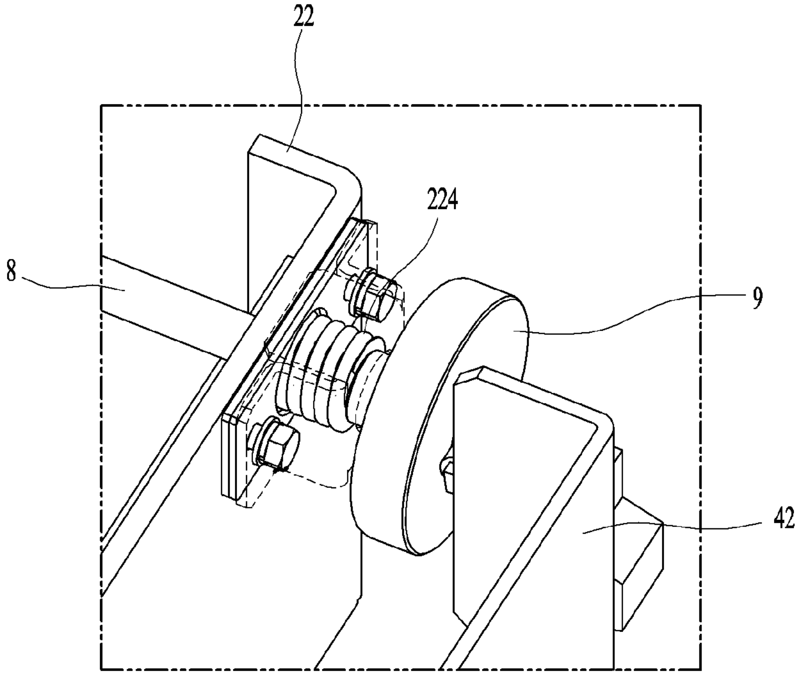

FIG. 9 is an enlarged partial perspective view of a portion of an arc elimination device according to one embodiment of the present disclosure. (a) of FIG. 9 illustrates that a bracket according to one embodiment of the present disclosure is indicated by a solid line, and (b) of FIG. 9 illustrates that the bracket according to the one embodiment of the present disclosure is indicated by a dotted line and a configuration projected by the bracket is indicated by a solid line.

FIGS. 10A to 10E are diagrams illustrating operation processes of a moving plate of an arc elimination device in accordance with one embodiment of the present disclosure. Configurations that are not necessary for explanation are not shown.

Figure 11:
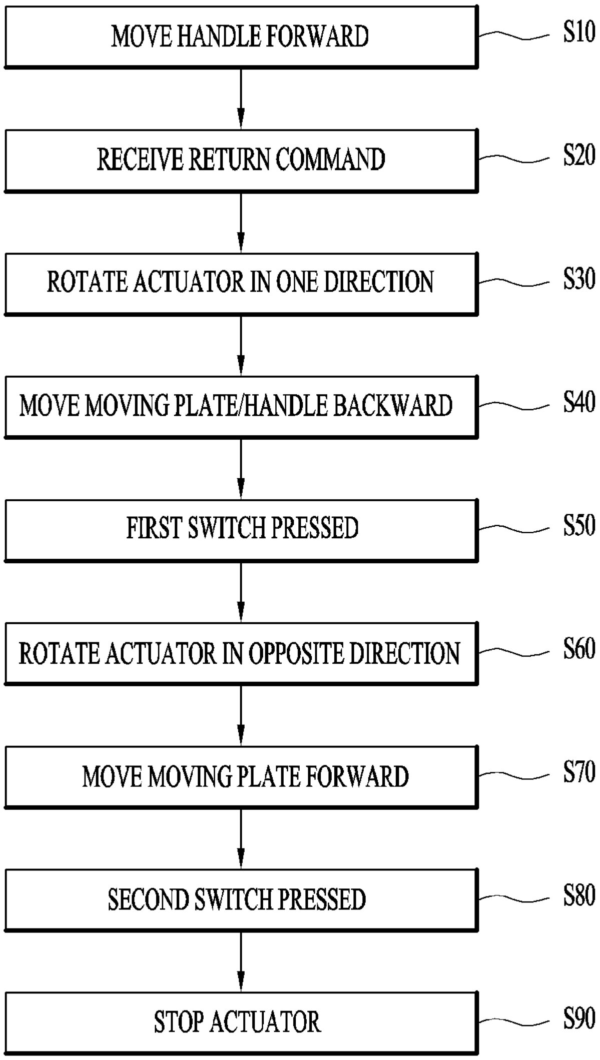

FIG. 11 is a flowchart illustrating operations of an arc elimination device in accordance with one embodiment of the present disclosure.

DETAILED DESCRIPTION

Hereinafter, embodiments of the present disclosure will be described in detail with reference to the accompanying drawings, so as to be easily implemented by those skilled in the art. The present disclosure may be implemented in many different forms and is not limited to the embodiment described herein. In order to clearly explain the present disclosure, parts not related to the description have been omitted in the drawings, and the same or equivalent components are given the same reference numerals throughout the specification.

The words and terms used in this specification and claims are not to be construed as limited in their usual or dictionary meanings, but should be interpreted with meaning and concepts consistent with the technical idea of the present disclosure according to the principle that the inventor can define terms and concepts in order to explain his or her invention in the best way.

Terms such as "include" or "has" are used herein and should be understood that they are intended to indicate an existence of several components, functions or steps, disclosed in the specification, and it is also understood that greater or fewer components, functions, or steps may likewise be utilized.

It will be understood that when an element is referred to as being disposed at "front," "rear," "top," or "bottom" of another element, it includes, unless otherwise specifically stated, not only a case where the element is disposed directly on "front," "rear," "top," or "bottom" of another element, but also a case where an intervening element is present between the elements. In addition, when an element is "connected" to another element, it includes, unless otherwise stated, not only being directly connected to each other, but also indirectly connected to each other.

The present disclosure provides an arc elimination device capable of electrically disconnecting a ground electrode and a high-voltage electrode by allowing a user to return a handle to an original position without a direct contact and manipulation, through a configuration that a moving plate moves the handle by pressing one side of the handle using driving force received from an actuator.

In describing the drawings below, each direction will be defined and explained based on a direction in which an operating rod of an arc elimination device is pulled out or pushed in. More specifically, referring to FIG. 1, a direction in which an operating rod 8 of an arc elimination device 1 is pushed into an arc extinguishing part 3 is defined as a front (forward) direction, while a direction in which the operating rod 8 is pulled out is defined as a rear (backward) direction. Additionally, based on FIG. 1, upper and lower (top and bottom) directions are defined.

Figure 1:
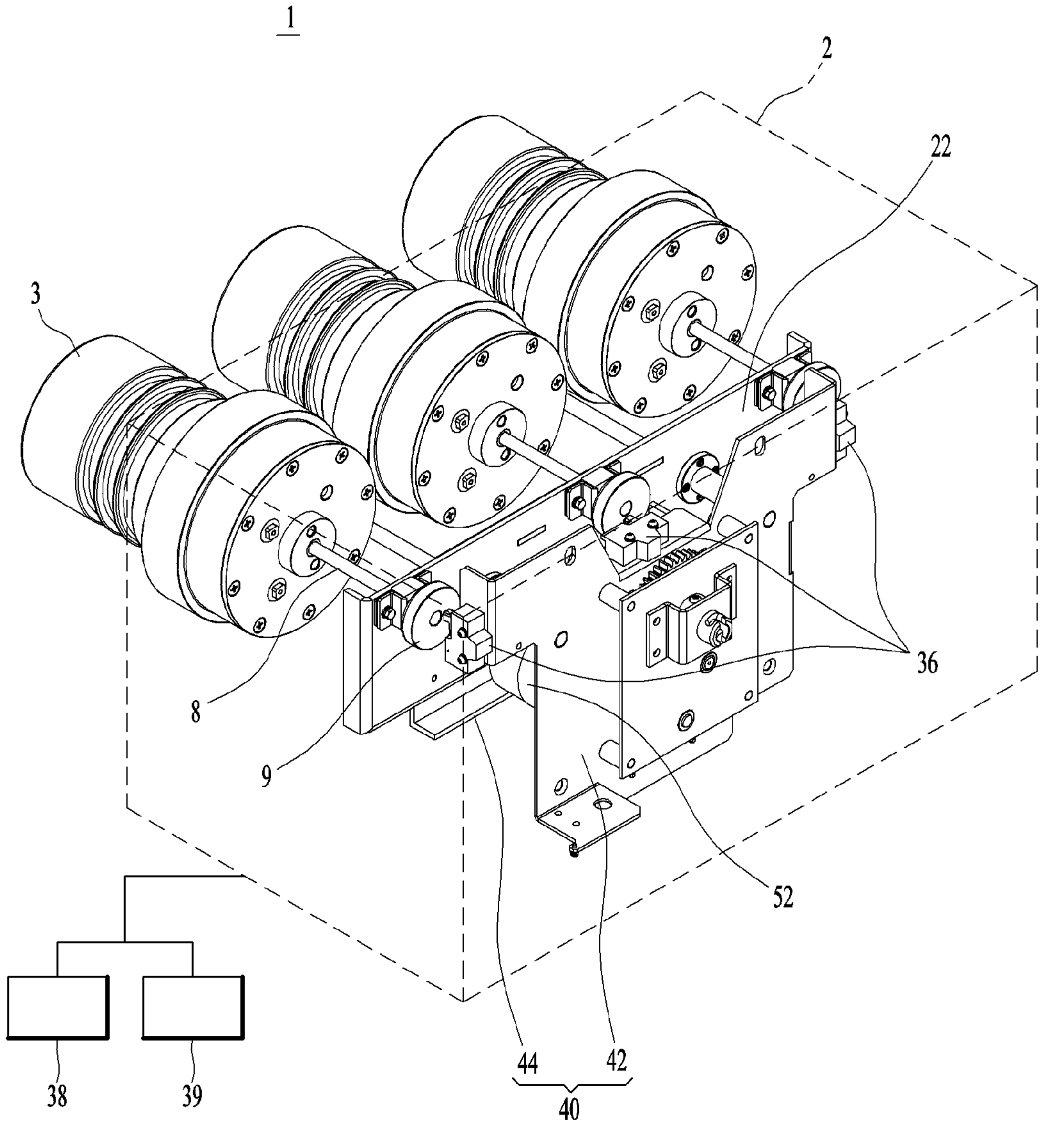
FIGS. 1 and 2 are perspective views illustrating an arc elimination device in accordance with one embodiment of the present disclosure, viewed at different angles.
Figure 2:
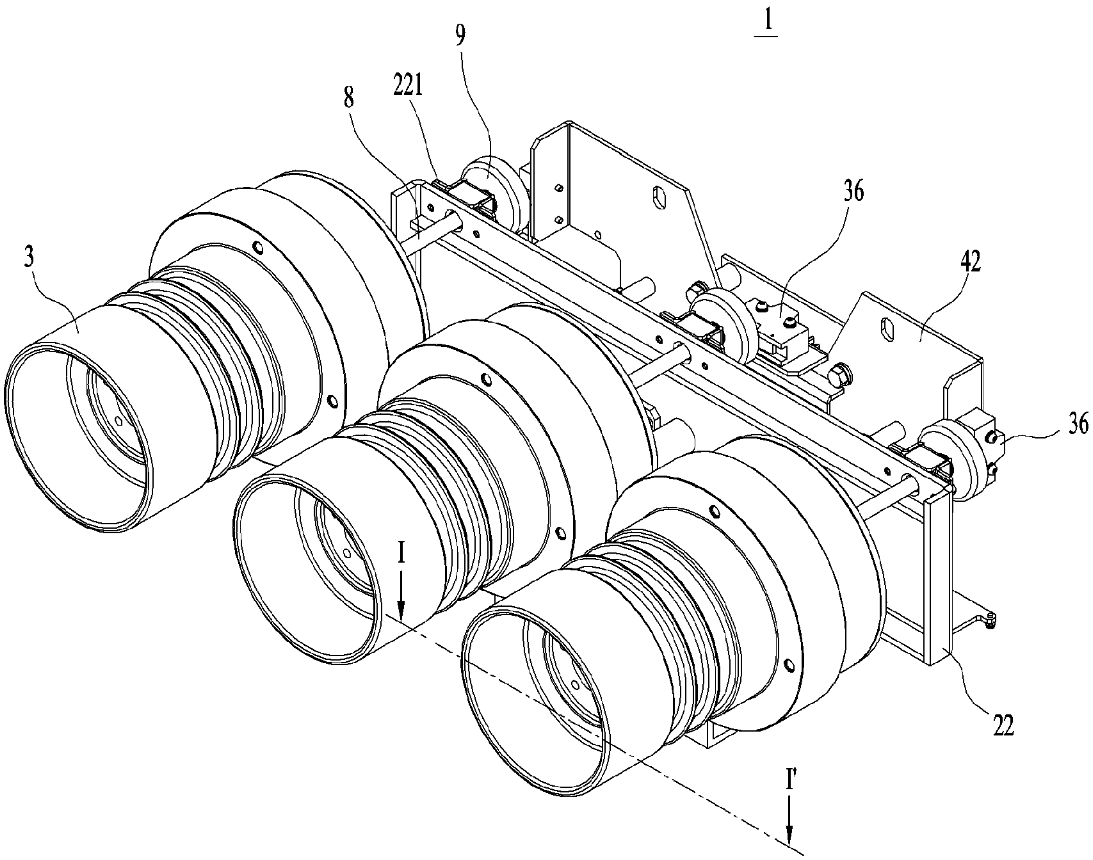
Figure 3:
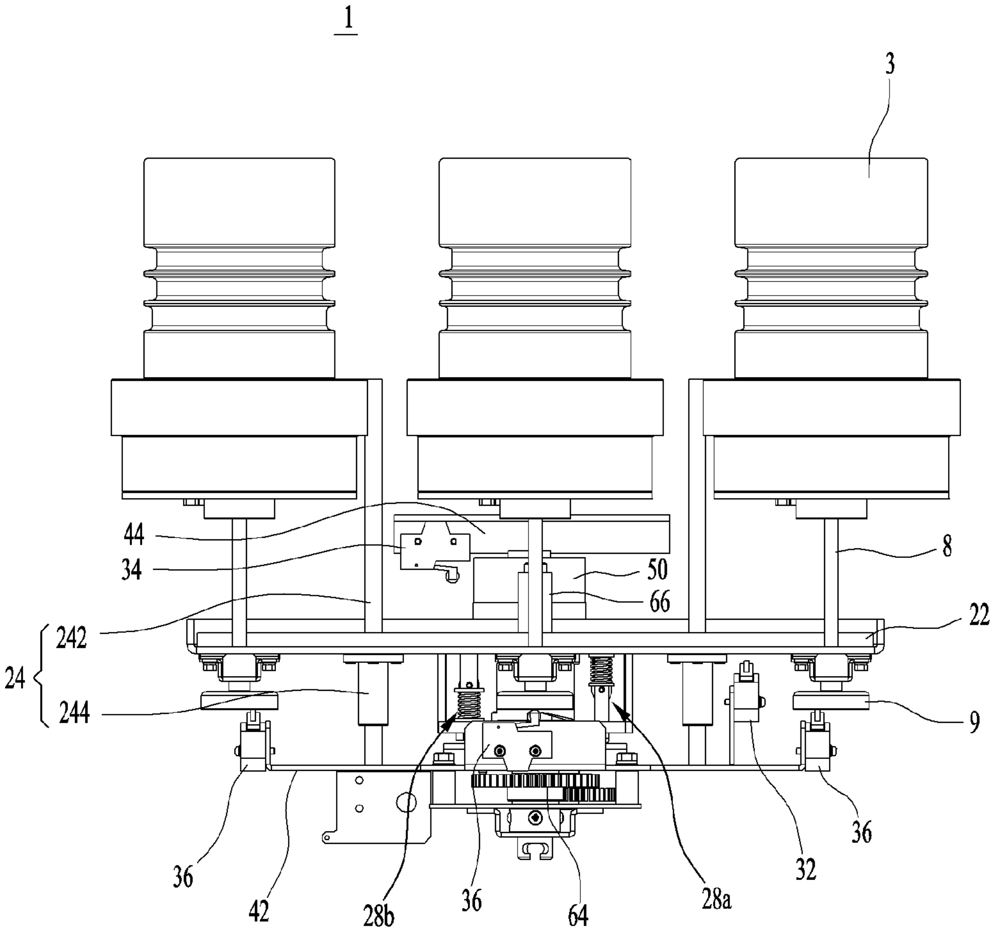
FIG. 3 is a planar view illustrating an arc elimination device in accordance with one embodiment of the present disclosure.
Figure 4:
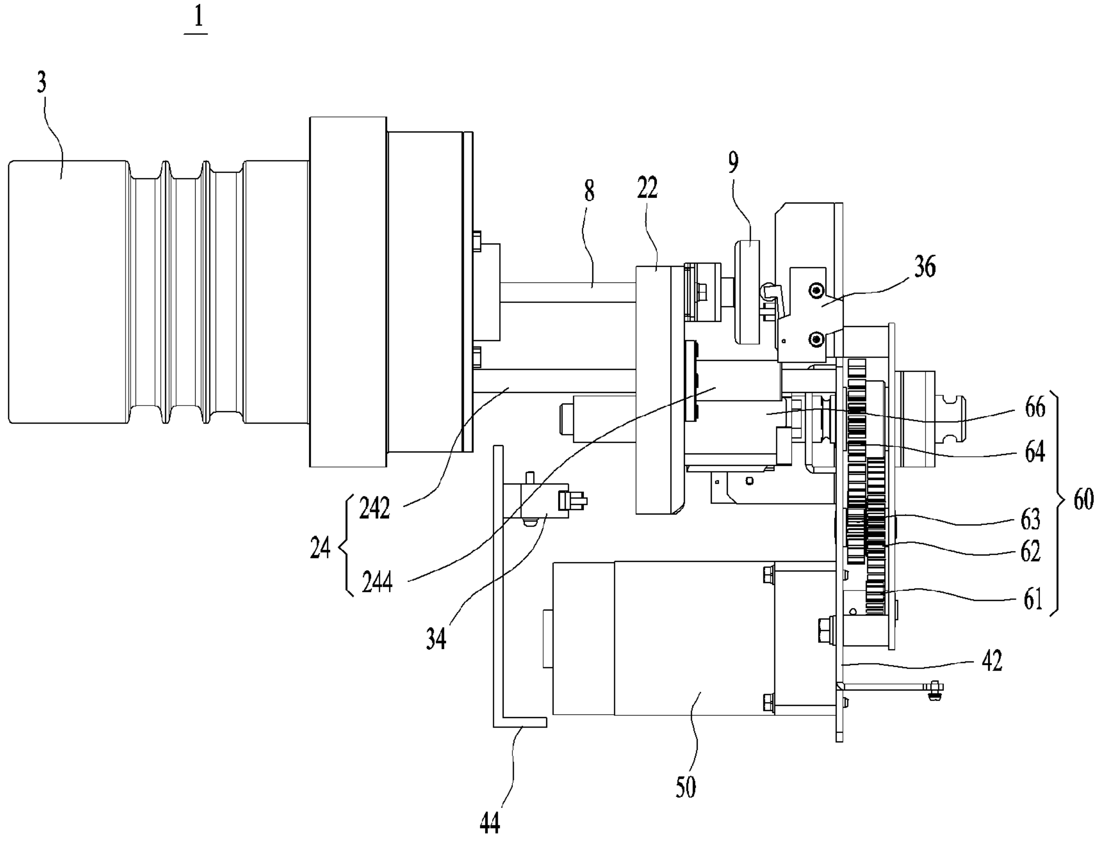
FIG. 4 is a lateral view illustrating an arc elimination device in accordance with one embodiment of the present disclosure.

FIGS. 1 and 2 are perspective views illustrating an arc elimination device in accordance with one embodiment of the present disclosure, viewed at different angles. FIG. 3 is a planar view illustrating an arc elimination device in accordance with one embodiment of the present disclosure. FIG. 4 is a lateral view illustrating an arc elimination device in accordance with one embodiment of the present disclosure.

Referring to FIGS. 1 to 4, an arc elimination device 1 according to one embodiment of the present disclosure may include a housing 2, an arc extinguishing part 3, an operating rod 8, a handle 9, a moving plate 22, a base plate 40, an actuator 50, and a power transmission unit 60. The housing 2 may be formed in the shape of a box, and receive therein and protect the arc extinguishing part 3, the operating rod 8, the handle 9, the moving plate 22, the base plate 40, the actuator 50, and the power transmission unit 60.

The arc extinguishing part 3 which is a cylindrical member may be installed in a switchgear. When an arc occurs, the arc extinguishing part 3 may electrically connect a high-voltage electrode and a ground electrode such that a high-voltage current flows to outside. At this time, the arc extinguishing part 3 may be installed through the front surface of the housing 2 such that a front end portion thereof is exposed to the outside of the housing 2.

The arc extinguishing part 3 may be provided in plurality, which are disposed to be neighbored to each other in parallel. At this time, the arc extinguishing part 3 may be provided for each phase. For example, in the case of a three-phase power system, three arc extinguishing parts 3 may be provided for each phase.

Figure 5:
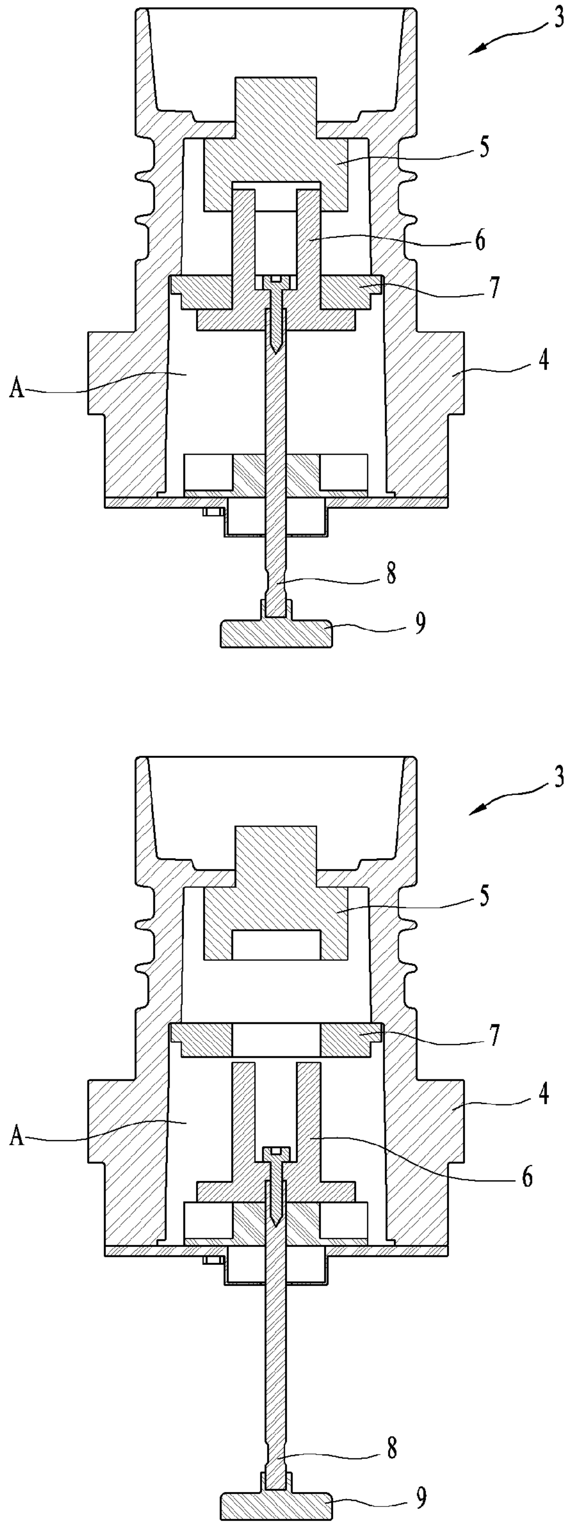
FIG. 5 is a sectional view illustrating an arc extinguishing part, an operating rod, and a handle, taken along the line I-I' of FIG. 1.

FIG. 5 is a sectional view illustrating an arc extinguishing part, an operating rod, and a handle, taken along the line I-I' of FIG. 1. Referring to FIG. 5, the arc extinguishing part 3 may include a casing 4, a high-voltage electrode 5, a movable electrode 6, and a ground electrode 7. The casing 4 is a cylindrical member made of an insulating material and may have a predetermined accommodation space A therein.

The high-voltage electrode 5 may penetrate the front surface of the casing 4. One side of the high-voltage electrode 5 may be exposed to the outside of the casing 4, and another side may be located inside the casing 4. A groove may be formed in another end portion of the high-voltage electrode 5, and the movable electrode 6, which will be described later, may be seated in the groove. At this time, the high-voltage electrode 5 may mean an electrode connected to a fixed busbar of a switchgear.

The ground electrode 7 may be disposed below the high-voltage electrode 5. A hole may be formed through the center of the ground electrode 7 and the movable electrode 6, which will be described later, may be inserted through the hole. At this time, the ground electrode 7 may refer to an electrode connected to an external ground through a ground busbar or a ground cable.

The operating rod 8, which is a rod-shaped member, may be disposed at the rear of the arc extinguishing part 3 to be movable in an axial direction. One end of the operating rod 8 may be disposed inside the accommodation space A of the casing 4 through the rear surface of the casing 4, and another end of the operating rod 8 may extend to the rear of the casing 4.

At this time, the movable electrode 6 may be coupled to the one end of the operating rod 8 disposed in the accommodation space A of the casing 4. A handle 9 that can be gripped by a user may be coupled to the another end of the operating rod 8. The movable electrode 6 may be movable forward and backward by the axial motion of the operating rod 8.

Referring to (a) of FIG. 5, the movable electrode 6 may penetrate the hole of the ground electrode 7 to be seated in the groove of the high-voltage electrode 5 as the operating rod 8 moves forward. At the same time, one side of the movable electrode 6 may be in contact with one side of the ground electrode 7. Accordingly, the high-voltage electrode 5 and the ground electrode 7 can be electrically connected by the movable electrode 6. Hereinafter, this state is referred to as an 'electrically-connected state.'

Referring to (b) of FIG. 5, the movable electrode 6 may be separated from the groove of the high-pressure electrode 5 as the operating rod 8 moves backward. In this case, the high-voltage electrode 5 and the ground electrode 7 cannot be electrically connected by the movable electrode 6. Hereinafter, this state is referred to as an 'electrically-disconnected state.'

The arc eliminating device according to one embodiment of the present disclosure may be disposed inside the switchgear. When an arc occurs in the switchgear, the arc elimination device may operate such that the ground electrode 7 and the high-pressure electrode 5 are electrically connected to each other. Accordingly, an overcurrent of the high-pressure electrode 5 can flow to the outside through the ground electrode 7.

The high-voltage electrode 5 and the ground electrode 7 may be electrically disconnected from each other as the handle 9 is pulled rearward after a fault situation due to the arc is ended.

Hereinafter, the position of the handle 9 when the operating rod 8 is inserted into the arc extinguishing part 3 so that the ground electrode 7 and the high voltage electrode 5 are in the electrically-connected state is referred to as a 'closed position,' while the position of the handle 9 when the operating rod 8 is pulled out of the arc extinguishing part 3 so that the ground electrode 7 and the high voltage electrode 5 are in the electrically-disconnected state is referred to as an 'open position.'

Meanwhile, the accommodation space A of the casing 4 may be a hermetic space blocked from the outside. The accommodation space A may be filled with insulating gas. For example, the accommodation space A may be filled with SF6. Accordingly, the ground electrode 7 and the high-voltage electrode 5 may be insulated by insulating gas in the state where they are not connected by the movable electrode 6, thereby being maintained in the electrically-disconnected state.

Referring back to FIGS. 1 and 2, the arc extinguishing part 3, the operating rod 8, and the handle 9 may be disposed inside the housing 2 in a forward-backward direction. A moving plate 22 may be disposed between the arc extinguishing part 3 and the handle 9 to be movable forward and backward. At this time, the moving plate 22 may be disposed perpendicular to the lower surface of the housing 2 so that both side surfaces face forward and backward, respectively.

At this time, the operating rod 8 may be coupled to be movable relative to the moving plate 22. For example, an operating rod hole 221 with a larger diameter than the operating rod 8 may be formed in an upper portion of the moving plate 22, and the operating rod 8 may be inserted through the operating rod hole 221.

The handle 9 coupled to the rear end portion of the operating rod 8 may be formed in the shape of a disk with a predetermined thickness so that the user can easily grip it. At this time, the diameter of the operating rod hole 221 of the moving plate 22 may be formed to be smaller than the diameter of the handle 9.

Accordingly, when the moving plate 22 moves backward, the handle 9 may be caught by the moving plate 22 and moved backward together with the moving plate 22. Conversely, when the moving plate 22 moves forward, the operating rod 8 and the moving plate 22 may be movable relative to each other, and the handle 9 disposed at the rear of the moving plate 22 is not caught by the moving plate 22. Thus, only the moving plate 22 of the moving plate 22 and the handle 9 can move forward.

The base plate 40 may include a first base plate 42 disposed behind the handle 9 and a second base plate 44 disposed at front of the handle 9. The base plate 40 may be disposed in parallel to the moving plate 22 and may be fixedly installed on the lower surface of the housing 2.

Referring to FIGS. 3 and 4, an actuator 50 that provides driving force to move the moving plate 22 may be disposed below the moving plate 22. The power transmission unit 60 may be installed and supported on the first base plate 42. The power transmission unit 60 may serve to transmit driving force generated by the actuator 50 to the moving plate 22.

The actuator 50 may be a motor, and a rotational shaft rotated by the motor may be installed at the rear of the motor. The power transmission unit 60 may include first to fourth gears 61, 62, 63, and 64 and a screw shaft 66.

Figure 6:
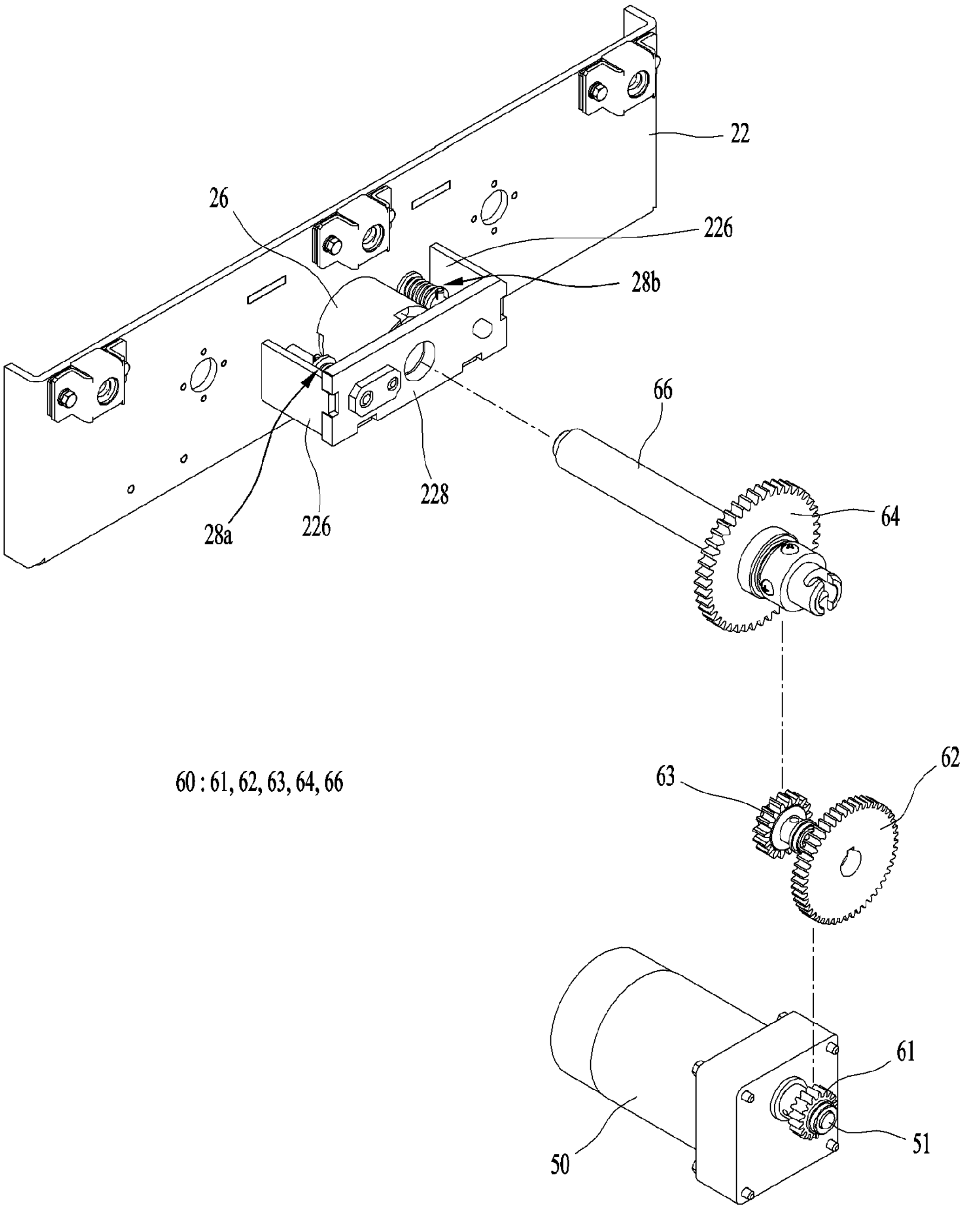
FIG. 6 is an exploded perspective view illustrating an actuator, a power transmission unit, a nut unit, and a moving plate of an arc elimination device in accordance with one embodiment of the present disclosure.

FIG. 6 is an exploded perspective view illustrating an actuator, a power transmission unit, a nut unit, and a moving plate of the arc elimination device in accordance with one embodiment of the present disclosure.

Referring to FIG. 6, the first gear 61 may be fixedly coupled to the rotational shaft 51 of the actuator 50 to be rotated integrally with the rotational shaft 51, and the fourth gear 64 may be fixedly coupled to one end portion of the screw shaft 66 to be rotated integrally with the screw shaft 66. The first gear 61 and the fourth gear 64 may be connected by the second gear 62 and the third gear 63.

The first to fourth gears 61, 62, 63, and 64 may transmit rotational driving force generated by the actuator 50 to the screw shaft 66 to rotate the screw shaft 66. In addition, the first to fourth gears 61, 62, 63, and 64 may appropriately convert rotational speed and direction of the rotational driving force generated by the actuator 50 and then transmit the converted information to the screw shaft 66.

The screw shaft 66 may extend forward through the moving plate 22. At this time, the screw shaft 66 and the moving plate 22 may be disposed to be movable relative to each other. That is, the rotational motion of the screw shaft 66 may not be converted directly into a forward and backward motion of the moving plate 22.

A nut unit 26 through which the screw shaft 66 is coupled may be disposed at the rear of the moving plate 22. The nut unit 26 may be formed in a cylindrical shape with a predetermined length, and include a through hole formed through the center of the cylinder in the central axis of the cylinder. The screw shaft 66 may be inserted through the through hole of the nut unit 26.

A screw thread (not illustrated) may be formed on an outer circumferential surface of the screw shaft 66. The screw thread of the screw shaft 66 may be screw-coupled with a thread (not illustrated) formed on an inner circumferential surface of the through hole of the nut unit 26.

Referring to FIG. 6, on both side portions of the center of the moving plate 22 may be provided a first frame 226 extending rearward by a predetermined length, and a second frame 228 disposed in parallel at the rear of the moving plate 22 and having both end portions coupled to the first frame 226.

A hole through which the screw shaft 66 passes may be formed through the center of the second frame 228. The nut unit 26 described above may be disposed between the moving plate 22 and the second frame 228. At this time, the hole of the second frame 228 and the through hole of the nut unit 26 may be disposed side by side to be aligned on the same central axis.

Meanwhile, the arc elimination device according to one embodiment of the present disclosure may further include coupling members **28*a* and 28*b*. That is, the nut unit 26 and the moving plate 22 and the nut unit 26 and the second frame 228 may be coupled by the coupling members 28*a* and 28*b***, respectively.

At this time, the coupling members **28*a* and 28*b* may perform a function of restraining the rotation of the nut unit 26 in addition to the function of coupling the nut unit 26 and the moving plate 22. That is, even if the screw shaft 66 rotates due to the driving force generated by the actuator, the nut unit 26 may be restricted from rotating by the coupling members 28*a* and 28*b* and thus may not rotate together with the screw shaft 66. The coupling members 28*a* and 28*b*** will be described later.

By using the coupling members **28*a* and 28*b* according to one embodiment of the present disclosure, the rotational motion of the screw shaft 66 can be converted into linear motion of the nut unit 26 and the moving plate 22. That is, the nut unit 26 and the moving plate 22 can move along the axial direction (forward-backward direction) of the screw shaft 66. For example, when the screw shaft 66 rotates in one direction, the nut unit 26 and the moving plate 22 coupled to the nut unit 26 may move forward. On the other hand, when the screw shaft 66 rotates in an opposite direction to the one direction, the nut unit 26 and the moving plate 22 coupled to the nut unit 26** may move rearward.

By the power generation and transmission process, the actuator may generate the driving force to move the moving plate 22, and the power transmission unit 60 may transmit the driving force generated by the actuator to the moving plate 22.

Referring back to FIGS. 3 and 4, the arc elimination device 1 according to one embodiment of the present disclosure may further include a guide unit 24 for guiding the motion of the moving plate 22. The guide unit 24 may include a guide rod 242 and a guide rod support member 244.

The guide rod 242 may penetrate one surface of the moving plate 22, and both ends of the guide rod 242 may be fixedly coupled to the housing 2 and the first base plate 42, respectively. At this time, the moving plate 22 and the guide rod 242 may be coupled to be movable relative to each other.

As a result, the moving plate 22 may be guided by the guide rod 242 to be stably movable forward and backward. Also, the guide rod 242 may be provided in plurality. For example, the guide rods 242 may be disposed symmetrically on the left and right with respect to the operating rod 8 disposed in the center.

In addition, the guide rod support member 244 may protrude rearward from one surface of the moving plate 22, for example, the rear surface of the moving plate 22 with reference to FIG. 3, and may be hollow such that the guide rod 242 is inserted therethrough. Accordingly, the guide rod 242 may be stably supported by the guide rod support member 244.

Meanwhile, the first base plate 42 may be disposed slightly more rearward than the handle 9 located at the open position, and the second base plate 44 may be disposed slightly more forward than the handle 9 located at the closed position.

Additionally, the moving plate 22 may be configured to be movable between a first position and a second position. At this time, the first position may be the position of the moving plate (the position of the moving plate 22 illustrated in FIG. 10D) in the state where the rear surface of the moving plate 22 is in contact with one surface of the front side of the handle 9 located at the open position. In addition, the second position may be the position of the moving plate (the position of the moving plate 22 illustrated in FIG. 10A) in the state where the rear surface of the moving plate 22 is in contact with one surface of the front side of the handle 9 located at the closed position.

Referring back to FIGS. 3 and 4, the arc elimination device 1 according to one embodiment of the present disclosure may further include a first switch 32, a second switch 34, and a third switch 36. The first switch 32 and the second switch 34 may refer to components that generate a start signal to control the actuator 50.

At this time, the first switch 32 may be installed on the first base plate 42 to be pressed by the moving plate 22 when the moving plate 22 is located at the first position, and the second switch 34 may be installed on the second base plate 44 to be pressed by the moving plate 22 when the moving plate 22 is located at the second position. Additionally, the third switch 36 may be installed on the first base plate 42 to be pressed by the handle 9 in the state where the handle 9 is located at the open position.

Meanwhile, the first to third switches 32, 34, and 36 may be limit switches. At this time, the limit switch may refer to a switch that is operated by the movement of a mechanical component or presence of an object. That is, the first and second switches 32 and 34 may be pressed on one side by the movement of the moving plate 22, and the first and second switches 32 and 34 with the one side pressed may generate a preset start signal to control the actuator 50.

Additionally, one side of the third switch 36 may be pressed by the movement of the handle 9, and the third switch 36 with the one side pressed may generate a predetermined signal. The roles played by the first to third switches 32, 34, and 36 and the signals generated by them will be described later with reference to FIGS. 10A to 10E and 11.

(a) of FIG. 7 is an exploded perspective view illustrating the nut unit and the coupling member of the arc elimination device according to the one embodiment of the present disclosure, and (b) and (c) of FIG. 7 are a front view and a rear view illustrating the nut unit in accordance with the one embodiment of the present disclosure. FIG. 8 is a view illustrating the operation of the coupling member of the arc elimination device in accordance with the one embodiment of the present disclosure. Configurations that are not necessary for explanation are not shown.

Referring to (a) of FIG. 7, a first coupling groove 261*a* and a second coupling groove 261*b* may be formed on front and rear surfaces of the nut unit 26 according to one embodiment of the present disclosure, respectively. In this instance, the first coupling groove 261*a* and the second coupling groove 261*b* may be provided in plurality, respectively.

The first coupling groove 261*a* may be formed along an edge of the front surface of the nut unit 26 in a predetermined section of the front surface of the nut unit 26. When viewed from the front based on (a) of FIG. 7 (i.e., based on (b) of FIG. 7), the first coupling groove 261*a* may be formed such that the depth of the groove (forward-backward depth) is gradually increased in a clockwise direction from a point located at 3 o'clock to a point located at 9 o'clock.

More specifically, the first coupling groove 261*a* may include a first guide surface 262*a* and a first support surface 263*a*. The first guide surface 262*a* may be formed as a curved surface that gently slopes in the depth direction (forward-backward direction) of the first coupling groove 261*a* as it goes clockwise along the edge of the front surface of the nut unit 26. At this time, the part where the slope of the first guide surface 262*a* begins is defined as the front end of the first guide surface 262*a*, and the part with the deepest axial depth is defined as the rear end of the first guide surface 262*a*.

The first support surface 263*a* may be formed at the rear end of the first guide surface 262*a* along the depth direction of the first coupling groove 261*a*. In this instance, the first support surface 263*a* may be disposed in parallel to the depth direction of the first coupling groove 261*a*. Of course, the first support surface 263*a* may be formed to be inclined sharply at a predetermined angle with the depth direction of the first coupling groove 261*a*.

At this time, the first coupling groove 261*a* may be provided in plurality along the front edge of the nut unit 26. For example, as illustrated in (b) of FIG. 7, the first coupling groove 261*a* may include a groove formed along the clockwise direction from 3 o'clock to 9 o'clock, and a groove formed along the clockwise direction from 9 o'clock to 3 o'clock.

Additionally, the second coupling groove 261*b* may be formed along the rear edge of the nut unit 26. When viewed from the front based on (a) of FIG. 7 (i.e., based on (c) of FIG. 7), the second coupling groove 261*b* may be formed such that the depth of the groove (forward-backward depth) is gradually increased in a counterclockwise direction from a point located at 6 o'clock to a point located at 12 o'clock.

In this instance, the second coupling groove 261*b* may be formed in a similar shape to the first coupling groove 261*a*. That is, the second coupling groove 261*b* may include a second guide surface 262*b* and a second support surface 263*b*, and the second guide surface 262*b* and the second support surface 263*b* may be formed similar to the first guide surface 262*a* and the first support surface 263*a*, respectively.

Referring to (a) of FIG. 7 and (a) of FIG. 8 together, the coupling members 28*a* and 28*b* according to one embodiment of the present disclosure may include a first coupling member 28*a* and a second coupling member 28*b*. At this time, the first coupling member 28*a* may include a first penetration pin 282*a*, a first connection member 284*a*, a first insertion pin 286*a*, and a first spring 288*a*.

The first penetration pin 282*a* may penetrate the moving plate 22 and the second frame 228, such that one end thereof protrudes forward of the moving plate 22 and another end protrudes toward the first base plate 42. Hereinafter, the another end of the first penetration pin 282*a* is referred to as a first contact portion 283*a*.

The first insertion pin 286*a* may penetrate the moving plate 22, such that one end thereof is inserted into the first coupling groove 261*a* and another end protrudes forward of the moving plate 22. The first connection member 284*a* may connect and couple the one end of the first penetration pin 282*a* protruding forward of the moving plate 22 and the another end of the first insertion pin 286*a*. Meanwhile, the first penetration pin 282*a*, the first connection member 284*a*, and the first insertion pin 286*a* may be welded to form a single rigid body.

The first spring 288*a* may be installed in the first penetration pin 282*a*. One side of the first spring 288*a* may be supported by the rear surface of the moving plate 22, and another side may be supported by a fixing pin installed on the middle of the first penetration pin 282*a*. The first insertion pin 286*a* may be fixedly inserted into the first coupling groove 261*a* by elastic force provided by the first spring 288*a*.

Accordingly, in a state where no external force acts on the first coupling member 28*a*, the first insertion pin 286*a* may be inserted into the first coupling groove 261*a*, and the first coupling member 28*a* may play a role of coupling the nut unit 26 and the moving plate 22.

The second coupling groove 28*b* may be formed in a similar manner to the first coupling groove 28*a*. That is, the second coupling member 28*b* may include a second insertion pin 286*b*, a second connection member 284*b*, a second penetration pin 282*b*, and a second spring 288*b*, which may be formed in a similar manner to the first insertion pin 286*a*, the first connection member 284*a*, the first penetration pin 282*a*, and the first spring 288*a*.

At this time, one end of the second penetration pin 282*b* may protrude toward the second base plate 44 and another end may protrude toward the first base plate 42. Hereinafter, the one end of the second penetration pin 282*b* is referred to as a second contact portion 283*b*.

Additionally, one end of the second insertion pin 286*b* may be inserted into the second coupling groove 261*b*, and another end may protrude toward the first base plate 42. The second connection member 284*b* may penetrate the second frame 228 to connect and couple the another end of the second insertion pin 286*b* protruding toward the first base plate 42 and the another end of the second penetration pin 282*b*.

Referring to (a) of FIG. 8, the first coupling member 28*a* and the second coupling member 28*b* may be in a normal state where no external force is applied.

In this case, even if the screw shaft 66 rotates counterclockwise when viewed from the rear, the first insertion pin 286*a* is locked in contact with the first support surface 263*a* of the nut unit 26. Due to the locking action between the first support surface 263*a* and the first insertion pin 286*a*, the nut unit 26 cannot rotate counterclockwise with the screw shaft 66. As a result, the rotational movement of the screw shaft 66 may be converted into axial motion (forward and backward motion) of the screw shaft 66 of the nut unit 26, and the moving plate 22 coupled with the nut unit 26 may move forward and backward.

Additionally, even if the screw shaft 66 rotates clockwise when viewed from the rear, the second insertion pin 286*b* is locked on the second support surface 263*b* of the nut unit 26. Due to the locking action between the second support surface 263*b* and the second insertion pin 286*b*, the nut unit 26 cannot rotate clockwise with the screw shaft 66. As a result, the rotational motion of the screw shaft 66 may be converted into the forward and backward motion of the nut unit 26, such that the moving plate 22 can be moved forward and backward.

Referring to (b) of FIG. 8, when the first contact portion 283*a* is brought into contact with the front surface of the first base plate 42 and the first coupling member 28*a* receives external force forward accordingly, the first coupling member 28*a* may be moved forward and the first insertion pin 286*a* may be separated from the first coupling groove 261*a*.

Meanwhile, the second insertion pin 286*b* of the second coupling member 28*b* slides on the second guide surface 262*b* when the nut unit 26 rotates counterclockwise. That is, since the locking action does not occur between the second insertion pin 286*b* and the second support surface 263*b*, the second coupling member 28*b* cannot perform a function of restraining the counterclockwise rotational motion of the nut unit 26.

As a result, the nut unit 26 can rotate counterclockwise with the screw shaft 66 without being restricted by the first and second coupling members 28*a* and 28*b*. Therefore, the rotational motion of the screw shaft 66 cannot be converted into the forward and backward motion of the nut unit 26, and the moving plate 22 cannot move forward and backward.

Referring to (c) of FIG. 8, when the second contact portion 283*b* of the second coupling member 28*b* is brought into contact with the rear surface of the second base plate 44 and the second coupling member 28*b* receives an external force backward, the second insertion pin 286*b* may be separated from the second coupling groove 261*b*.

Additionally, the first insertion pin 286*a* of the first coupling member 28*a* slides on the first guide surface 262*a* when the nut unit 26 rotates clockwise. That is, the first insertion pin 286*a* and the second insertion pin 286*b* cannot perform the function of restricting the clockwise rotational motion of the nut unit 26.

With the configuration, the nut unit 26 can rotate clockwise together with the screw shaft 66. Therefore, the rotational motion of the screw shaft 66 cannot be converted into the forward and backward motion of the nut unit 26, and the moving plate 22 cannot move forward and backward.

The arc elimination device according to one embodiment of the present disclosure may release the coupling between the moving plate 22 and the nut unit 26 by the action of the first and second coupling members 28*a* and 28*b* and the first and second base plates 42 and 44, such that the moving plate 22 cannot receive driving force from the actuator 50 anymore.

In addition, the arc elimination device according to one embodiment of the present disclosure can restrict the moving plate 22 from moving beyond a preset section (i.e., a section between the first base plate 42 and the second base plate 44), thereby suppressing the operating rod 8 from being excessively drawn out of the arc extinguishing part 3 and preventing damage and malfunction of the arc elimination device 1 which may be caused by the motion of the moving plate 22.

FIG. 9 is an enlarged partial perspective view of a portion of the arc elimination device according to one embodiment of the present disclosure. (a) of FIG. 9 illustrates that a bracket according to one embodiment of the present disclosure is indicated by a solid line, and (b) of FIG. 9 illustrates that the bracket according to the one embodiment of the present disclosure is indicated by a dotted line and a configuration projected by the bracket is indicated by a solid line.

Referring to FIG. 9, the arc elimination device according to one embodiment of the present disclosure may further include an elastic member 224 disposed on the rear surface of the moving plate 22, and a bracket 222 by which the elastic member 224 is fixedly installed on the moving plate 22.

The elastic member 224 may be a coil spring, and the operating rod 8 may penetrate the center of the coil spring. One side of the elastic member 224 may be supported by the rear surface of the moving plate 22. The bracket 222 may be installed on the rear surface of the moving plate 22 to fix and support the coil spring.

As a result, when the moving plate 22 presses the handle 9 while moving forward and backward, the elastic member 224 and the bracket 222 according to one embodiment of the present disclosure can alleviate impacts that may occur between the moving plate 22 and the handle 9 and suppress damages on the handle 9 and other components located at the rear of the handle 9.

Hereinafter, with reference to FIGS. 10A to 10E and FIG. 11, the operating processes of the moving plate by the control unit and the first to third switches according to one embodiment of the present disclosure will be described in more detail.

FIGS. 10A to 10E are diagrams illustrating operation processes of a moving plate of an arc elimination device in accordance with one embodiment of the present disclosure. Configurations that are not necessary for explanation are not shown. FIG. 11 is a flowchart illustrating operations of an arc elimination device in accordance with one embodiment of the present disclosure.

Referring back to FIG. 1, the arc elimination device 1 according to one embodiment of the present disclosure may further include a control unit 38 and a signal generation unit 39. The control unit 38 may be electrically connected to first to third switches 32, 34, and 36 and the actuator 50 to transmit and receive electrical signals.

The signal generation unit 39 may be electrically connected to the first to third switches 32, 34, and 36 to receive electrical signals, and may generate a specific signal when receiving a predetermined signal.

Of course, the signal generation unit 39 may be electrically connected to the control unit 38 to transmit and receive signals. At this time, the specific signal may mean light, sound, or an electrical signal or wireless communication signal that can be received by another device.

Figure 10A:
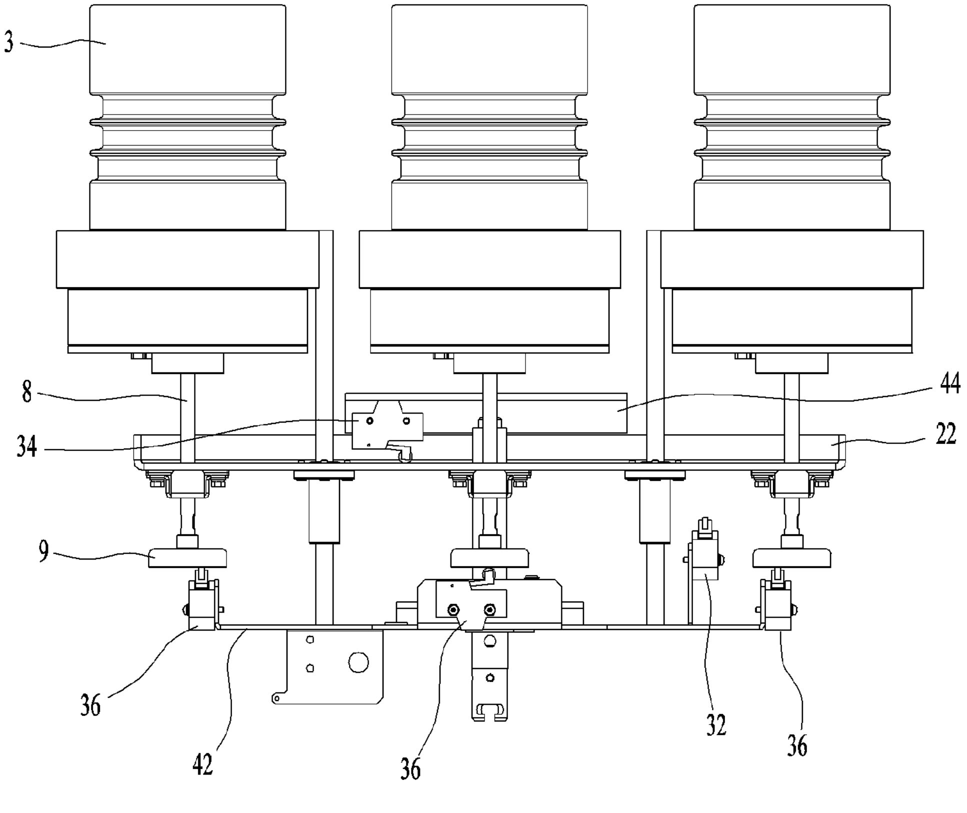

Referring to FIG. 10A, the moving plate 22 may be located at a second position and the handle 9 may be located at the open position. In this case, the ground electrode and the high-voltage electrode inside the arc extinguishing part 3 are in the electrically-disconnected state in which they are not connected to each other by the movable electrode.

At this time, the third switch 36 may be pressed by the handle 9 located at the open position. The third switch 36 pressed by the handle 9 may generate a predetermined electrical signal and then transmit this electrical signal to the signal generation unit 39. The signal generation unit 39 may generate the specific signal by receiving the electrical signal from the third switch 36.

The signal generated from the signal generation unit 39 may be used to make the user recognize that the handle 9 is located at the open position. For example, the signal generation unit 39 may display with light or sound that the handle 9 is located at the open position.

Figure 10B:
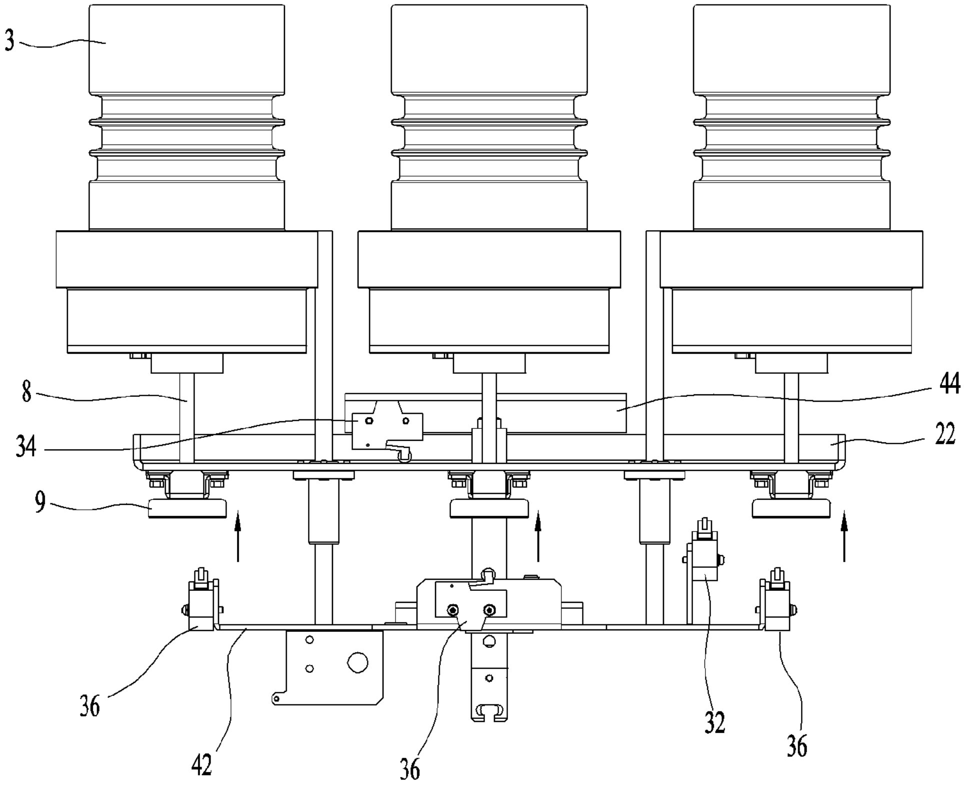

Referring to FIGS. 10B and 11, the handle 9 may move forward, in response to a predetermined situation, to be located at the closed position, thereby electrically connecting the ground electrode and the high-voltage electrode inside the arc extinguishing part (S10).

For example, an optical sensor that detects an arc generated in a switchgear where the arc elimination device 1 is disposed may transmit a signal for moving the operating rod 8 and the handle 9 to the control unit 38. The control unit 38 which has received the signal from the optical sensor may control a driving device (not illustrated), which can move the operating rod 8, so as to move the handle 9 forward.

More specifically, referring to FIG. 6 together, as the operating rod 8 moves into the arc extinguishing part 3, the movable electrode 6 coupled to one end of the operating rod 8 may connect the high-voltage electrode 5 and the ground electrode 7, such that the high-voltage electrode 5 and the ground electrode 7 can be electrically connected. As a result, the high-voltage electrode 5 and the ground electrode 7 inside the arc-extinguishing part 3 are in the electrically-connected state.

Figure 10C:
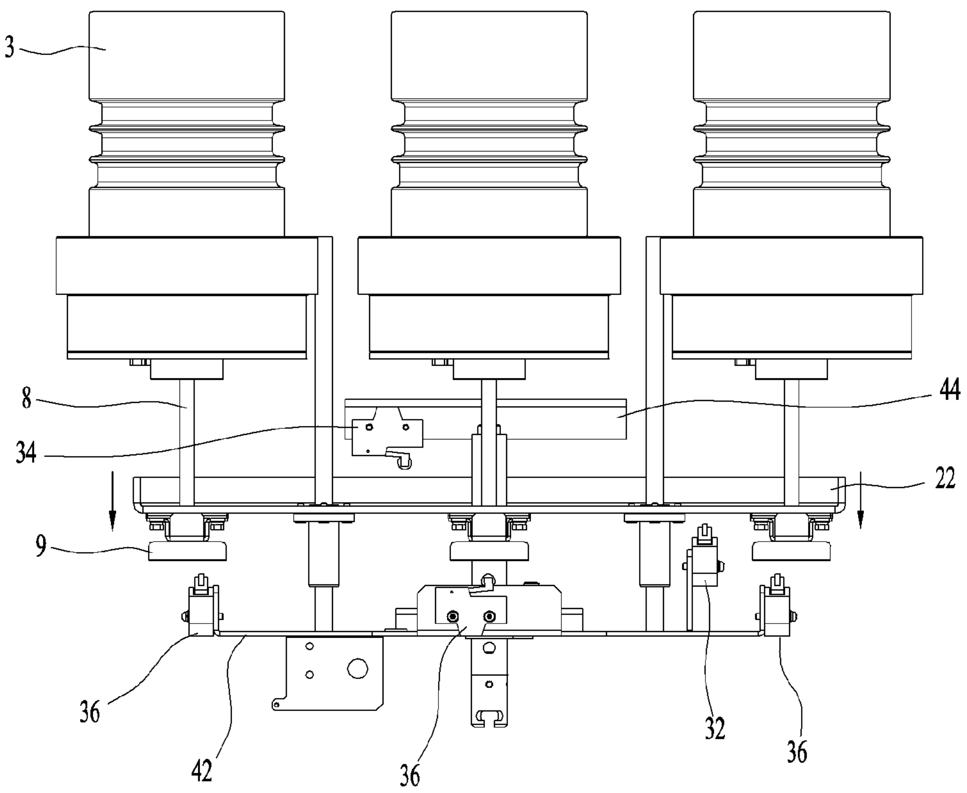

Referring to FIGS. 10C and 11, after receiving a return command from the outside (S20), the control unit 38 may control the actuator to rotate the rotational shaft in one direction (S30). At this time, the return command may mean a signal transmitted from the outside to the control unit to return the handle 9 of the arc elimination device to the open position.

The moving plate 22, which receives driving force from the actuator and the power transmission unit, may be moved rearward, and the handle 9 located at the rear of the moving plate 22 may be caught by the moving plate 22 to be moved rearward together with the moving plate 22 (S40).

Figure 10D:
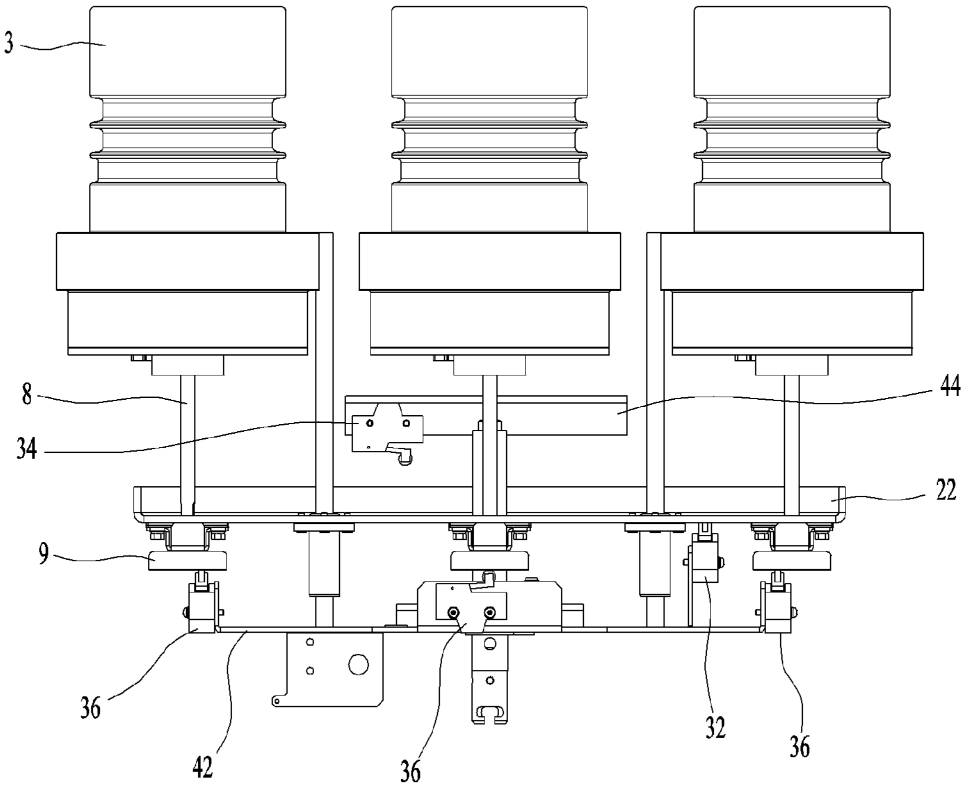

Referring to FIGS. 10D and 11, the moving plate 22 may be moved rearward to be located at the first position. Additionally, the handle 9 may be moved rearward together with the moving plate 22 to be located at the open position.

At this time, the first switch 32 may be pressed by the moving plate 22 located at the first position (S50). Additionally, the third switch 36 may be pressed by the handle 9 located at the open position.

Referring to FIG. 6 again, as the moving plate 22 is located at the first position, the handle 9 is located at the open position. The operating rod 8, which moves integrally with the handle 9 and the movable electrode 6 coupled to one end of the operating rod 8 are moved to the outside of the arc extinguishing part 3, and thus the high-voltage electrode 5 and the ground electrode 7 are not connected to each other. As a result, the high-voltage electrode 5 and the ground electrode 7 inside the arc-extinguishing part 3 are in the electrically-disconnected state.

The third switch 36 pressed by the handle 9 may transmit a predetermined electrical signal to the signal generation unit 39, and the signal generation unit 39 that has received the electrical signal from the third switch 36 may generate a specific signal again.

Meanwhile, even if the first switch 32 cannot generate a start signal for controlling the actuator due to being damaged, the first coupling member of the arc elimination device according to one embodiment of the present disclosure may release the coupling between the nut unit and the moving plate 22, thereby stopping the motion of the moving plate 22.

Figure 10E:
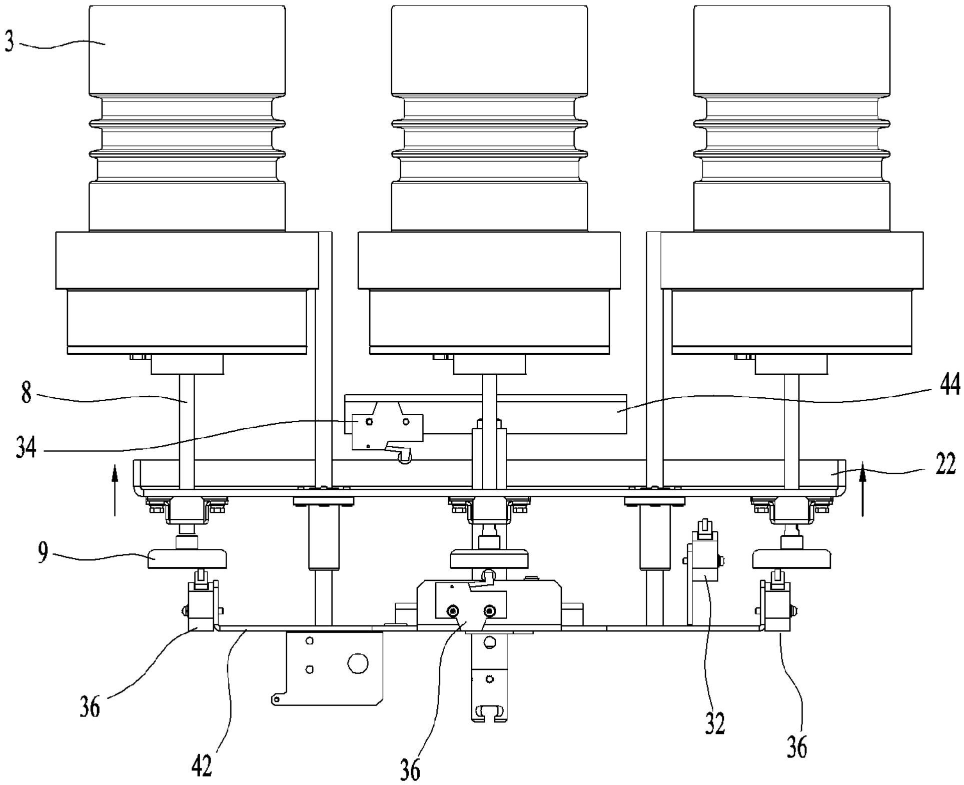

Referring to FIGS. 10E and 11, the first switch 32 pressed by the moving plate 22 may transmit a start signal to the actuator to rotate the rotational shaft in an opposite direction to the one direction. The actuator that has received the start signal from the first switch 32 may rotate the rotational shaft in the opposite direction to the one direction (S50).

The moving plate 22, which has received driving force from the actuator and the power transmission unit, may move forward (S70). At this time, the handle 9 that is located at the rear of the moving plate 22 may not be caught by the moving plate 22 that moves forward, so as to be kept located at the open position.

Referring to FIG. 6 again, in this case, since the moving plate 22 moves forward but the handle 9 remains at the open position, the operating rod 8 and the movable electrode 6 coupled to the one end of the operating rod 8 may be maintained in the moved state to the outside of the arc extinguishing part 3, so that the high-voltage electrode 5 and the ground electrode 8 cannot be connected to each other. As a result, the high-voltage electrode 5 and the ground electrode 7 inside the arc-extinguishing part 3 remain in the electrically-disconnected state.

Referring back to FIGS. 10D and 11, the moving plate 22 may be moved forward and located at the second position. At this time, the second switch 34 may be pressed by the moving plate 22 located at the second position (S80).

The second switch 34 pressed by the moving plate 22 may transmit a start signal to the actuator 50 to stop the operation of the actuator 50. The actuator that has received the start signal from the second switch 34 may stop its operation (S90). As a result, the moving plate 22 may stop moving and remain at the second position (hereinafter, referred to as a ‘standby state’).

In this case, referring back to FIG. 6, since the moving plate 22 is located at the second position but the handle 9 remains at the open position, the operating rod 8 and the movable electrode 6 coupled to the one end of the operating rod 8 may be maintained in the moved state to the outside of the arc extinguishing part 3, so that the high-voltage electrode 5 and the ground electrode 8 cannot be connected to each other. As a result, the high-voltage electrode 5 and the ground electrode 7 inside the arc-extinguishing part 3 continuously remain in the electrically-disconnected state.

Meanwhile, even if the second switch 34 cannot generate a start signal for stopping the operation of the actuator due to being damaged, the second coupling member of the arc elimination device according to one embodiment of the present disclosure may release the coupling between the nut unit and the moving plate 22, thereby stopping the motion of the moving plate 22.

Meanwhile, the control unit and the signal generation unit according to one embodiment of the present disclosure may be implemented by one or more microprocessors or may be implemented by circuit configurations for specific functions. Of course, the functions of the control unit and the signal generation unit may be implemented using various programming and scripting languages and algorithms using them.

Of course, the control unit and the signal generation unit according to one embodiment of the present disclosure may be implemented as an array of multiple logic gates, and may be implemented by a combination of a general-purpose microprocessor and a memory storing a program that can be executed by the microprocessor.

As discussed above, the arc elimination device according to one embodiment of the present disclosure can return the handle from the closed position to the open position using the moving plate that moves by receiving driving force from the actuator. As a result, the arc elimination device according to one embodiment of the present disclosure can remotely return the handle to the open position without a user’s direct contact with and manipulation of the handle, thereby increasing the user’s safety and convenience.

In addition, the arc elimination device according to one embodiment of the present disclosure is provided with the plurality of switches that generate a start signal to control the actuator, and the plurality of switches are disposed to be pressed according to the position of the moving plate, which can allow the moving plate to remain in the standby state, in which the moving plate is stopped after returning to its original position (i.e., the second position), even without an input of a separate signal, in addition to a return command.

In the arc elimination device according to one embodiment of the present disclosure, the moving plate may be configured not to receive driving force anymore from the actuator when the moving plate moves beyond a preset section, thereby preventing the operating rod from being excessively pulled out of the arc extinguishing part and suppressing other components of the arc elimination device from being damaged due to the motion of the moving plate.

Although the embodiment of the present disclosure has been described, the idea of the present disclosure is not limited to the embodiment presented in this specification, and those skilled in the art who understand the scope of the present disclosure can easily propose other embodiments by addition, change, deletion, etc. of components within the scope of the same technical idea, but it should be understood that those addition, change, deletion, etc. are embraced within the technical idea of the present invention.

DESCRIPTION OF REFERENCE NUMERALS

1: Arc elimination device
2: Housing
3: Arc extinguishing part
4: Case
5: High-voltage electrode
6: Movable electrode
7: Ground electrode
8: Operating load
9: Handle
22: Moving plate
24: Guide unit -continued 26: Nut unit
28a: First coupling member
28b: Second coupling member
32: First switch
34: Second switch
36: Third switch
38: Control unit
39: Signal generation unit
40: Base plate
42: First base plate
44: Second base plate
50: Actuator
60: Power transmission unit
61: First gear
62: Second gear
63: Third gear
64: Fourth gear
66: Screw shaft

The invention claimed is:

1. An arc elimination device comprising:

a housing;

an arc extinguishing part that is located inside the housing and provided with a high-voltage electrode and a ground electrode therein;

an operating rod that is movable to electrically connect or disconnect the high-voltage electrode and the ground electrode inside the arc extinguishing part;

a handle that is coupled to one end of the operating rod to move the operating rod;

a moving plate that is disposed between the arc extinguishing part and the handle to be movable while pressing the handle;

an actuator that applies driving force to move the moving plate; and a power transmission unit that transmits the driving force of the actuator to the moving plate so that the moving plate is moved in a direction of pressing the handle;

a control unit that controls the actuator; and a first switch and a second switch that generate a start signal for controlling the actuator, wherein the moving plate is formed to be movable between a first position spaced apart from the arc extinguishing part in a direction toward the handle and a second position located closer to the arc extinguishing part than the first position, and wherein the control unit controls the moving plate to move from the first position to the second position when the first switch is pressed, and stops an operation of the actuator when the second switch is pressed.

2. The arc elimination device of claim 1, wherein the arc extinguishing part is configured so that the ground electrode and the high-voltage electrode are in an electrically-disconnected state when the handle is located at a third position, the arc elimination device further comprises:

a third switch that is pressed by the handle when the handle is located at the third position; and a signal generation unit that generates a specific signal when the third switch is pressed.

3. The arc elimination device of claim 1, further comprising:

a first base plate that is disposed adjacent to the first position and fixed to the housing, and a second base plate that is disposed adjacent to the second position and fixed to the housing.

4. The arc elimination device of claim 3, wherein the first switch is installed on the first base plate to be pressed by the moving plate when the moving plate is located at the first position, the second switch is installed on the second base plate to be pressed by the moving plate when the moving plate is located at the second position, and the first switch and the second switch are each limit switches.

5. The arc elimination device of claim 3, wherein the actuator is a motor with a rotational shaft, and the control unit rotates the rotational shaft in one direction when receiving a return signal, and rotates the rotational shaft in a direction opposite to the one direction when the first switch is pressed.

6. The arc elimination device of claim 5, wherein a nut unit is coupled to the moving plate to be movable integrally with the moving plate, and the power transmission unit includes a screw shaft that is coupled to the nut unit and is rotated by the motor.

7. The arc elimination device of claim 6, wherein the power transmission unit includes a plurality of spur gears connecting the screw shaft and the rotational shaft of the motor.

8. The arc elimination device of claim 6, wherein the nut unit includes a coupling groove, the nut unit and the moving plate are coupled by a coupling member which has one end inserted into the coupling groove and another end protruding toward the first base plate through the moving plate, and the one end of the coupling member is separated from the coupling groove when the another end of the coupling member is pressed by the first base plate, so that the coupling between the nut unit and the moving plate is released.

9. The arc elimination device of claim 8, wherein a fixing spring is installed on the coupling member to provide elastic force for inserting the one end of the coupling member into the coupling groove.

10. The arc elimination device of claim 3, further comprising a guide rod that is disposed in parallel to a moving direction of the moving plate and having both ends fixedly coupled to the housing and the first base plate, wherein the guide rod penetrates the moving plate.

11. The arc elimination device claim 1, further comprising an elastic member that is disposed on the moving plate to alleviate impacts between the moving plate and the handle.

12. The arc elimination device of claim 1, wherein the arc extinguishing part is provided in plurality, and the plurality of arc extinguishing parts are disposed side by side to be adjacent to one another.

* * * * *